United States Patent
Murray

(10) Patent No.: US 6,226,682 B1
(45) Date of Patent: May 1, 2001

(54) COUNTING OCTETS AND IMPLEMENTING THE OCTET COUNTING MODE

(75) Inventor: Chris Murray, Boynton Beach, FL (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/053,975

(22) Filed: Apr. 2, 1998

(51) Int. Cl.[7] .................................................. G06F 15/16
(52) U.S. Cl. ............................. 709/236; 714/49; 714/746
(58) Field of Search .................................... 370/242–245; 709/236, 260; 710/52, 57; 714/4, 18, 25, 43, 49, 704, 712, 746

(56) References Cited

U.S. PATENT DOCUMENTS 5,787,075 * 7/1998 Uchida ................................. 370/252
6,078,584 * 6/2000 Mottishaw et al. .................. 370/385

OTHER PUBLICATIONS

International Telecommunication Union—ITU–T Recommendation Q.703 (Mar. 1993) Specifications of Signalling System No. 7—Signalling Link.

* cited by examiner

Primary Examiner—John A. Follansbee
(74) Attorney, Agent, or Firm—Fleit, Kain, Gibbons, Gutman & Bongini P.L.; Jon A. Gibbons

(57) ABSTRACT

In a communications system implementing Signaling System No. 7, the system comprising a link, a transmitter for transmitting digital data on the link, and a receiver; a communications method comprises: coupling to the link for receiving data; receiving data from the link; detecting an error condition of SS7 requiring the receiver circuit to operate in an octet counting mode; and initiating the counting of received octets, the counting beginning after detecting the error condition. The method can be implemented in a variety of ways, including without limitation, as a specially dedicated stand alone unit, as an adapter card in a computer system, or as a computer-readable medium such as a diskette or a digital transmission.

17 Claims, 4 Drawing Sheets

US 6,226,682 B1

COUNTING OCTETS AND IMPLEMENTING THE OCTET COUNTING MODE

CROSS-REFERENCE TO RELATED APPLICATIONS

Not applicable.

BACKGROUND OF THE INVENTION

1. Field of the Invention

The present invention relates generally to digital communications networks and more particularly to methods and apparatus for efficiently counting octets and implementing an octet counting mode in Signaling System No. 7.

2. Description of the Related Art

Digital communications systems have been replacing analog systems for the past several decades. Present communications needs, including cellular telephones and computer networks, rely almost exclusively on digital systems. Signaling System No. 7 ("SS7") is an all digital intelligent network and it provides the networking control for most of this communication. In the 1960s, the Telecommunications Standards Society of the International Telecommunications Union (once known as the CCITT) developed Signaling System No. 6 ("SS6"), which was the predecessor to SS7. The central element of SS7 is that it separates the signaling information from the data. SS7 utilizes a message structure which allows control information to be routed to network nodes independently of the data to which the control information pertains. In the telephone communications industry, this enables call set-up and tear down to be done much faster and without tying up a voice/data line.

One of the first uses for SS7 was to enable switching networks to process 800 numbers. This necessitated retrieving routing information for the 800 number, as well as billing information, from a central database, and SS7 provided this capability. Indeed, this database access capability is used in a variety of telephone services, such as providing information for Caller ID, for verifying credit card numbers and personal identification numbers ("PINs"), and for providing subscriber information amongst different cellular regions to allow Call Roaming.

Many other methods of signaling have been used in the past, including using direct current ("DC") levels, Single Frequency tones above the audible range, current interruption for rotary dialing, and In-Band signaling in the audible range. Each of these had significant limitations which pushed the industry toward an all digital network and which SS7 overcomes.

The current European standard for SS7 is a standard referred to as Q.703. The standard contains all of the specifications that a SS7 provider must meet. One of these involves counting octets (or 8-bit bytes) as they are received and performing a series of functions after a given number, usually 16, of octets have been counted. One such function is to put the system into an octet counting mode if particular error conditions exist.

In a typical application, a digital signal processor ("DSP") is used to interface to the actual transmission medium and to receive and transmit the information. In a system utilizing a DSP, the system designer will typically implement much of the SS7 standard in software which will be downloaded into the DSP. Because the software is resident in the DSP, it is well-suited to the tasks that are generated every 16 octets.

Other implementations of SS7 are not as well-suited to performing these tasks, however. Another popular method of implementing communications devices is to use a serial communications controller, such as a Universal Asynchronous Receiver Transmitter ("UART"). These devices cannot process code (software, firmware, etc.) and must use another processing device, such as a microprocessor or some other intelligent peripheral device or programmable device. This requires the serial communications device to interrupt the processor and this is a time consuming process. In an implementation in which the processor controls multiple communications lines, the processor will be interrupted multiple times every 16 octets. This severely impairs performance. Accordingly, there is a need for a method and system for implementing SS7 which overcome these problems.

SUMMARY OF THE INVENTION

Briefly, in accordance with one aspect of the invention, in a communications system implementing Signaling System No. 7, the system comprising a link and a transmitter for transmitting digital data on the link, a receiver circuit comprises: means for coupling to the link for receiving data; means for receiving data from the link; means for detecting an error condition of SS7 requiring the receiver circuit to operate in an octet counting mode; and means for initiating the counting of received octets, the counting beginning after detecting the error condition.

Briefly, in accordance with other aspects of the invention, in a communications system implementing Signaling System No. 7, the system comprising a link, a transmitter for transmitting digital data on the link, and a receiver, a computer readable medium comprises instructions for, or a method comprises the steps of: coupling to the link for receiving data; receiving data from the link; detecting an error condition of SS7 requiring the receiver to operate in an octet counting mode; and initiating the counting of received octets, the counting beginning after detecting the error condition.

DETAILED DESCRIPTION OF AN EMBODIMENT

1. Overview

In order to save time and to increase performance, the preferred embodiment does not count all of the octets that are received. The SS7 protocol would ordinarily require the system to check for the existence of an error condition every N octets, where N is typically 16. However, unless there is an error condition, SS7 does not require that anything else be done when the N octets are received.

Therefore, instead of checking for an error condition every N octets, the preferred embodiment waits until an error occurs. The system is designed, as explained later, so that an error generates an interrupt, at which point the system starts counting octets and doing the other tasks required during an error condition. The principal task during an error condition is to increment one of two different counters, if required.

The two different counters which are incremented, if required, are the Signal Unit Error Rate Monitor ("SUERM") and the Alignment Error Rate Monitor ("AERM"). SS7 contains additional specifications which determine which, if either, of the two counters are incremented.

The prior art implementation would begin incrementing the counters as soon as it discovered that an error condition existed, and this would be at the end of the set of N octets in which the error condition started. If the time required to receive N octets is considered an "octet period," then the counters could be incremented before the error condition had existed for an octet period. Subsequent increments during the same error condition, however, would be at octet periods. For example, if the error condition arose after 4 octets had been received, the system would check for and notice the error after 16 octets had been received and then increment the appropriate counter if any. In this way, the counter could be incremented after only 12 additional octets had been received, which is less than an octet period.

In contrast, the preferred embodiment does not start counting until the error condition arises. Therefore, the counters would never be incremented before an octet period had passed after the error condition began. This difference is minimal, however, and the performance is within acceptable limits.

The error condition persists, and the incrementing of counters continues, until a good frame is received.

2. Frame Structures

Figure 1:
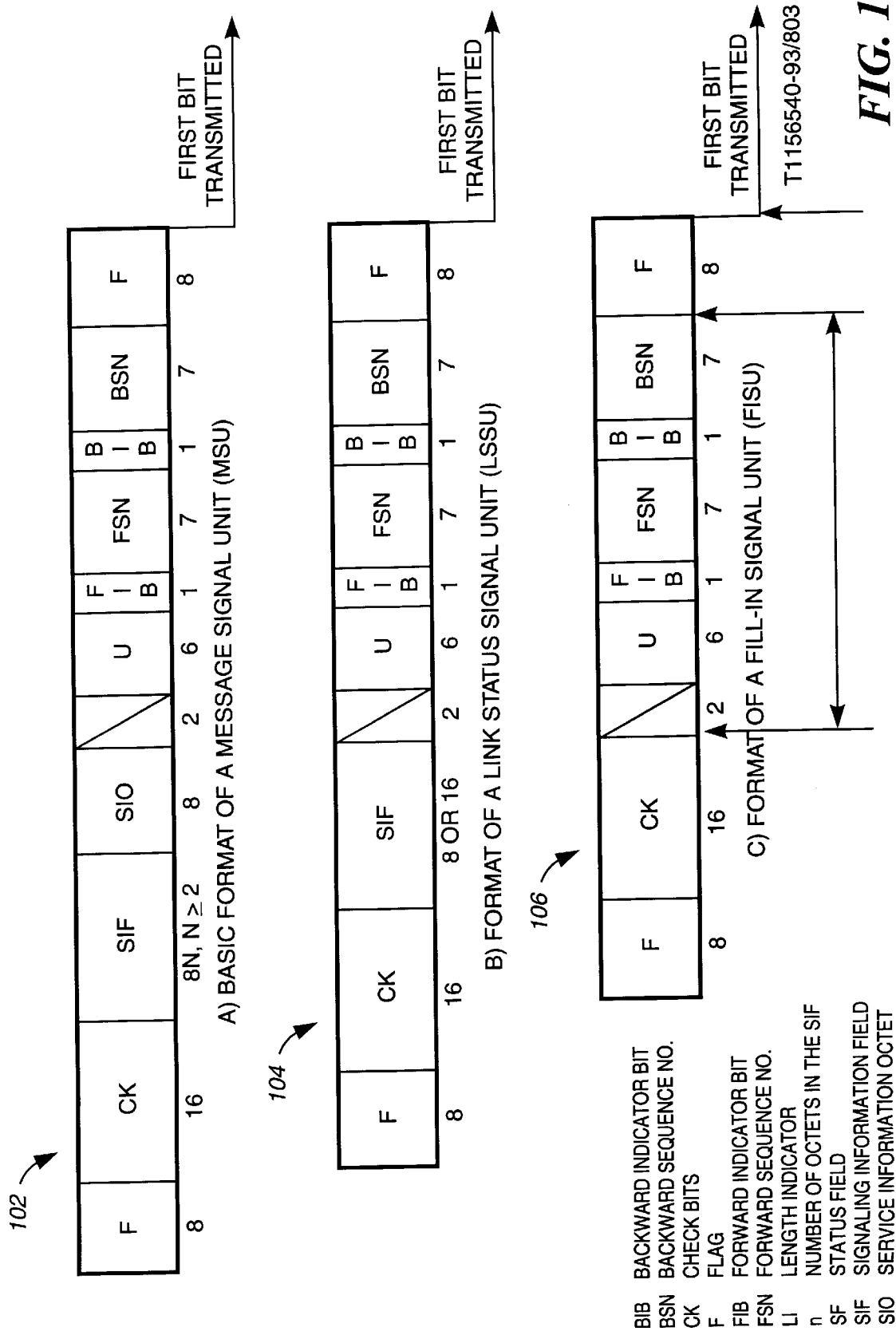
FIG. 1 is shows the signal unit formats for SS7.

SS7 dictates the conditions that must be met in order for a frame to be considered to be good. There are three general types of frame, or signal unit, configurations allowable in SS7, and each of these is shown in FIG. 1. Each of the three types of frames begins with an opening flag, ends with a closing flag, and the closing flag is preceded by two bytes of error detection, such as a cyclical redundancy check ("CRC"). The opening flag of one frame is normally considered to be the closing flag of the preceding signal unit. A flag that is not immediately followed by another is considered to be an opening flag.

The flag is an eight bit sequence with a hexadecimal value of 7E. In order to guard against inadvertent flags being sent and received, zero-stuffing is employed. On the transmitting end, a zero is inserted after every 5 consecutive 1s except for flags. On the receiving end, the zero is removed.

Referring to FIG. 1, a Message Signal Unit (an "MSU") 102 is variable length and can range from 9–280 bytes, including both flags. A Link Status Signal Unit ("LSSU") 104 is also variable length, and can range from 8–9 bytes, including both flags. A Fill-in Signal Unit ("FISU") 106 is fixed length and is 7 bytes, including both flags. In this way, the link is never idle when using SS7 protocol. If there is no signaling information to be sent, then either a LSSU or a FISU will be sent.

3. Errors Requiring Operation in an Octet Counting Mode

As mentioned earlier, the incrementing of SUERM or AERM is conditioned in part on the existence of an error condition. Only two errors, however, are encompassed. The first is the reception of seven consecutive 1s, which can be referred to as an ABORT error (or an ABORT state), and the second is the reception of more than 276 octets (not including either flag or the CRC) in a single signal unit, which can be referred to as a Terminal Count error. If either of these errors occurs, then the system must enter an octet counting mode.

The first error condition can occur, for example, when there is an underrun condition. An underrun condition occurs when the transmitter is requesting data, for example from a Direct Memory Access device ("DMA"), but cannot get any. In such a case, the transmitter will go into a marking state and send all 1s. After receiving seven 1s, the receiver will declare an ABORT error. The second error condition can occur for a variety of reasons, such as an error on the closing flag. The receiver must keep a counter of how many bytes have been received in a given signal unit. Other errors, such as a bad CRC, do not require entering an octet counting mode and are handled with other techniques such as a retransmission request.

4. Circuit Description and Operation

Figure 2:
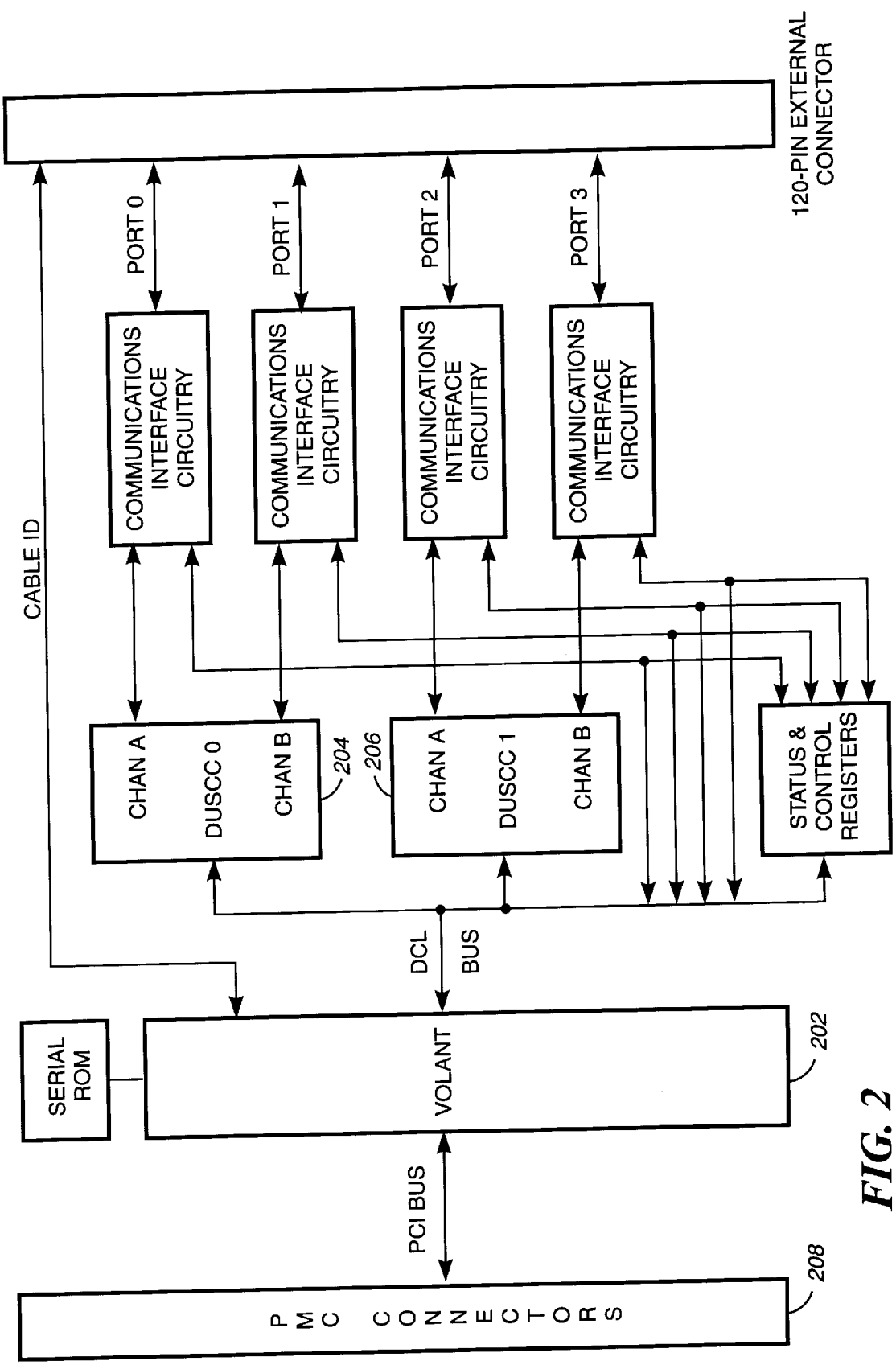
FIG. 2 is a functional block diagram of a daughter card, which communicates with the base card of FIG. 3, according to the present invention.
Figure 3:
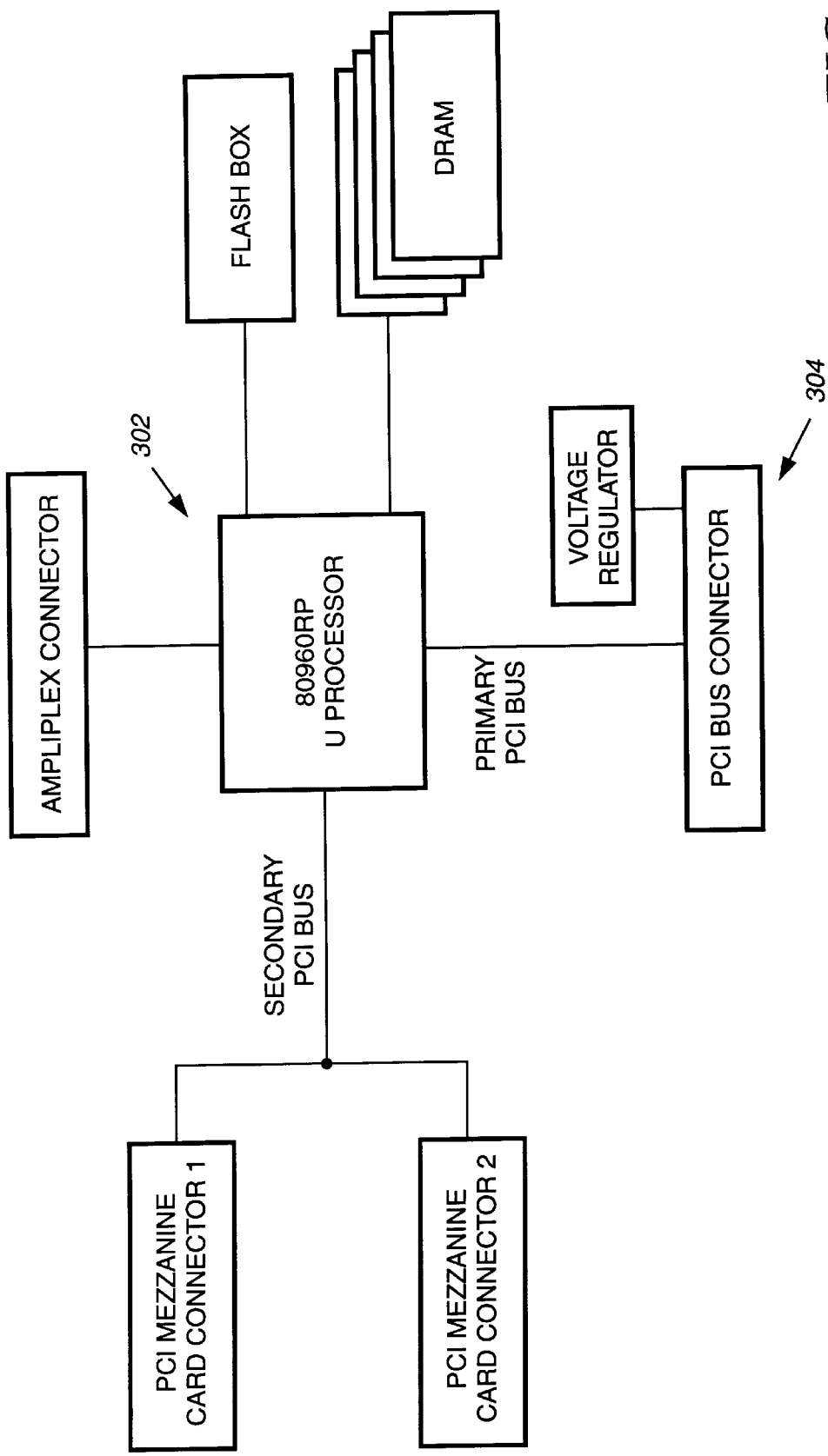
FIG. 3 is a functional block diagram of a base card containing a microprocessor, according to the present invention.

FIGS. 2 and 3 show high-level block diagrams of the preferred embodiment. FIG. 2 is a block diagram of a daughter card, and the principal components are the Volant Direct Memory Access Controller by International Business Machines ("IBM") (the "Volant DMA" or the "Volant") 202 and the two Dual Universal Serial Communication Controllers by Philips Semiconductors (the "DUSCCs") 204, 206. The PMC Connector 208 is used to connect the daughter card to the base card or another larger system. FIG. 3 is a block diagram of the base card and the principal components are the 80960 RP Microprocessor by Intel (the "80960") 302 and the PCI Bus Connector 304. The PCI Bus Connector 304 provides the means for the 80960 302 to communicate with the daughter card. In an alternate embodiment, the base card could use the 80960 HX Microprocessor by Intel.

Referring to FIG. 2, each DUSCC 204, 206 has two channels, providing four channels for the daughter card. Each channel can provide rates equivalent to a European T1 line, 2.048 Mbits/sec., if the DUSCC is operated in its DMA mode. The DUSCC has two operating modes which are a byte mode and a DMA mode. The DMA mode is much faster than the byte mode.

As a reference, T1 lines are often used for heavy telephone traffic, or for computer networks linked directly to the Internet. The U.S. standard provides for a telephone line connection for digital transmission that can handle 24 voice or data channels at 64 kilobits per second, over two twisted pair wires. The overall transmission bit rate is 1.544 million bits per second which is also equivalent to the ISDN Primary Rate Interface for the U.S. The European counterpart to T1 (called E1) has a transmission rate of 2.048 million bits per second.

Because software cannot be downloaded into the DUSCCs 204, 206, the DUSCCs 204, 206 need to interrupt the 80960 302 to process interrupts. If the preferred embodiment checked for an error condition every 16 octets, this would require 1 interrupt every 16 octets on each port and would severely deteriorate performance and throughput. Note that all four ports need not be operated at the same speed nor be synchronized if they are operating at the same speed.

The Volant 202 is used to detect the Terminal Count errors. The Volant 202 can be programmed with the expected number of bytes in a given frame and can count down from this number. If this downcounter in the Volant 202 reaches zero, then it causes an interrupt to the 80960 302. The Volant 202 is typically programmed with the maximum length+1 of an MSU, which would be 277 not including either flag nor the CRC. Alternatively, any other number can be selected if the MSU length is shorter for a given application or transmission. The maximum frame size is determined at the time that the link is set up and started.

The Volant 202 also has a Linked List Chaining ("LLC") feature that allows it to chain from one block of memory to another. These blocks are then used to program the Volant 202 channels. The Volant 202 can support up to eight channels, for example four transmit and four receive, and each channel would have its own linked list. One of the benefits of this feature is that the Volant 202 need not interrupt the 80960 302 each time that a data block is processed. The Volant 202 merely chains to the next memory block and the software running on the 80960 302 need only process the data blocks before the Volant 202 goes around the entire queue.

In the present embodiment, these memory blocks are referred to as Read Control Blocks ("RCBs"), and a circular queue of 128 RCBs is used. Because this number is configurable, different embodiments may have different size queues. Each RCB contains a structure called a Channel Descriptor Block ("CDB"), which is defined by the Volant specification. The CDBs in turn contain programming information for the Volant 202, such as the Channel Control Register ("CCR"). The CCR contains bits that are used, amongst other things, to turn on or off the end-of-frame ("EOF") interrupt, which the Volant specification refers to as an end-of-process ("EOP") interrupt. Normally, the EOF interrupt is turned off, which means that the Volant 202 will not interrupt the 80960 302. However, in an octet counting mode, the EOF interrupt needs to be turned on, as explained below.

The DUSCCs 204, 206 receive the serial data streams and pass the data on to the Volant 202. The DUSCCs 204, 206 perform several functions, however, before passing the data on to the Volant 202. One of these functions is to check for an ABORT sequence of 7 consecutive ones. The DUSCC 204, 206 is able to perform this comparison with a built-in function. A DSP, in an alternative embodiment, could perform this functionality with downloaded code, or with a built-in function depending on the architecture. Yet another alternate embodiment could use standard logic off of the DUSCC 204, 206 or DSP to detect the sequence. If either DUSCC 204, 206 receives an ABORT sequence on either channel, then it issues an interrupt to the Volant 202, and the Volant 202 passes it on to the 80960 302.

Figure 4:
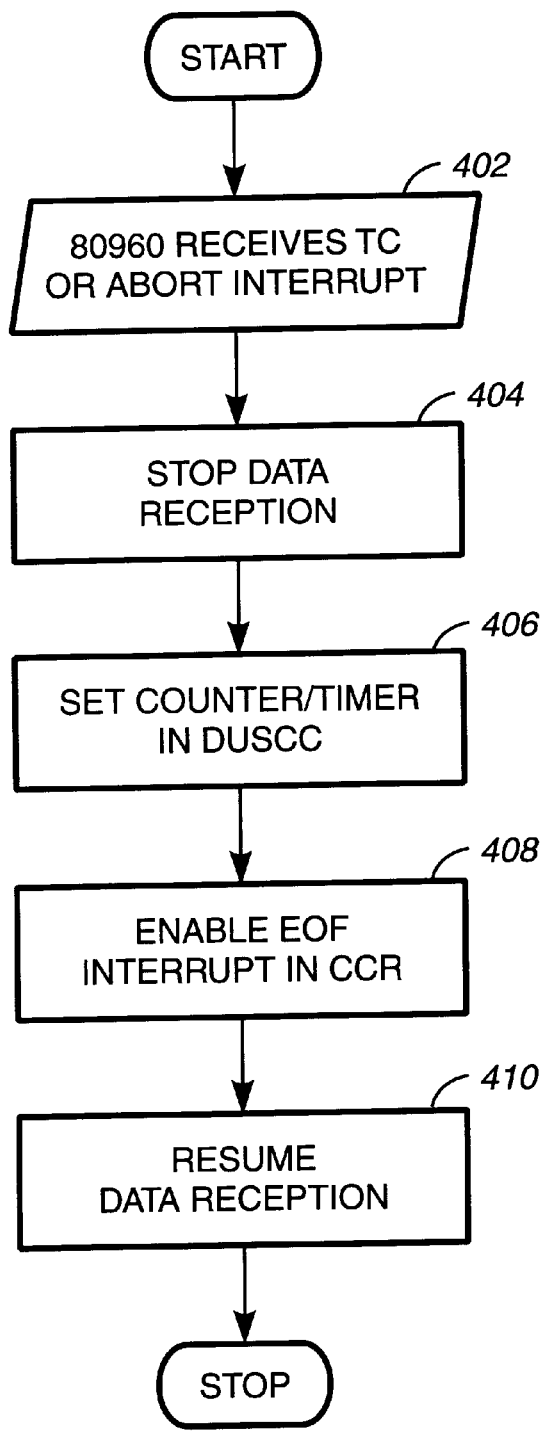
FIG. 4 is a flow diagram for the interrupt handler routine for the Terminal Count and ABORT interrupts, according to the present invention.

Upon receiving either a Terminal Count interrupt or an ABORT interrupt, the 80960 302 executes an interrupt handler routine to put the system into an octet counting mode. FIG. 4 is a flow diagram 400 that outlines the steps that this interrupt handler routine performs.

After receiving the interrupt 402, the 80960 302 momentarily stops the system from receiving any more data 404. The 80960 302 actually resets the appropriate channel on both the Volant 202 and the DUSCC 204, 206 so that they can be resynchronized and cleared of the old data. Then the 80960 302 programs and starts a counter/timer 406 in the appropriate DUSCC 204, 206. Each DUSCC 204, 206 has two counter/timers and one is used for each channel. The counter/timer is programmed so that it generates an interrupt every 16 octets, which is equivalent to 128 bits. A different interrupt handler routine processes these interrupts and increments, if necessary, either the SUERM or the AERM.

After programming and starting the counter/timer 406, the routine enables the EOF interrupt 408 in the appropriate Volant channel. The EOF interrupt is enabled by setting or clearing the appropriate bits in the appropriate RCB in the circular queue. The preferred embodiment continues to use the RCB that was being used by the Volant 202 when the error occurred.

The interrupt handler routine must search for the RCB that was being used when the error occurred. This is due to the fact that the Volant 202 is programmed to move to the next RCB when a Terminal Count error occurs, and to the fact that the system may take an indeterminate amount of time to process the interrupt that is generated. The indeterminate length of time may be due to interrupt masking, for example. Because of these facts, the Volant 202 will have moved on to another RCB at least once. When the desired RCB is found, the preferred embodiment repositions the queue so that the desired RCB is the current RCB, and the EOF is then enabled in this RCB.

Enabling the EOF interrupt ensures that the system will not operate in an octet counting mode any longer than necessary. When a valid frame is received, the EOF interrupt will go off and the EOF interrupt handler routine will take the system out of the octet counting mode. The two principal steps required in taking the system out of the octet counting mode are to stop the counter/timer on the 80960 302, and to turn off the EOF interrupt.

Once the EOF interrupt is enabled in the CCR 408, the routine resumes data reception 410. The typical steps of pushing and popping the stack, or otherwise preserving the state during this interrupt service routine have not been shown, but are required.

The process described in FIG. 4 can be executed for each of the four channels. Additionally, if a given channel receives another Terminal Count or ABORT error before it receives a valid frame, then the process will be executed again. There will, however, be two primary differences. First, the counter/timer continues to run and does not need to be reprogrammed and restarted. Second, the interrupt handler routine knows which RCB was being used and need not search for it. In this way, the same RCB is used until a valid frame is received. A frame is valid when an EOF interrupt is received and the frame meets several other criteria described in the specification, such as not being too long.

5. General Implementation

This particular implementation revolves around the particular functions provided by the Volant 202, the DUSCC 204, 206, and the 80960 302. Although a schematic and source code have not been provided, a designer/programmer who is skilled in the art will be able to implement the embodiment described. It will also be clear to one of ordinary skill in the art that the invention can be implemented with different algorithms and with other chip sets, including microprocessors, communications controllers, memory controllers, DSPs, intelligent peripherals, etc.

Counting octets and implementing the octet counting mode, in accordance with the present invention can be done with hardware, software (including firmware), or a combination of both. Moreover, this functionality may be embodied in computer readable media such as 3.5 inch diskettes to be used in programming an information-processing apparatus to perform in accordance with the invention. This functionality may also be embodied in computer readable media such as a transmitted waveform to be used in transmitting the information or functionality.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed:

1. In a communications system implementing Signaling System No. 7, the system comprising a link and a transmitter for transmitting digital data on the link, a receiver circuit comprising:

means for coupling to the link for receiving data;

means for receiving data from the link;

means for detecting an error condition of SS7 requiring the receiver circuit to operate in an octet counting mode; and means for initiating the counting of received octets, the counting beginning after detecting the error condition.

2. The circuit of claim 1, wherein the means for detecting an error condition comprises a means for detecting the reception of a disconnect sequence on the link.

3. The circuit of claim 1, wherein the means for detecting an error condition comprises a means for detecting the reception of overflow data on the link.

4. The circuit of claim 2, wherein the means for receiving data comprises a receive port on a serial communications controller.

5. The circuit of claim 4, wherein the means for coupling to the link comprises a trace leading to the receive port.

6. The circuit of claim 5, wherein the means for detecting the reception of a disconnect sequence comprises a comparator circuit and means for transmitting an interrupt signal, both of which are comprised in a serial communications controller.

7. The circuit of claim 6, wherein the means for initiating the counting of received octets comprises:

means for receiving the interrupt signal from the serial communications controller, wherein the means for receiving the interrupt is comprised on a microprocessor;

an external memory device; and an interrupt service routine, wherein the interrupt service routine is stored in the external memory device and runs on the microprocessor.

8. The circuit of claim 2, wherein the means for receiving data comprises a receive port on a digital signal processor ("DSP").

9. The circuit of claim 8, wherein the means for coupling to the link comprises a trace leading to the receive port.

10. The circuit of claim 9, wherein the means for detecting the reception of a disconnect sequence comprises comparing-code that compares the disconnect sequence with the received data, wherein the code is stored and run on the DSP.

11. The circuit of claim 10, wherein the means for initiating the counting of received octets comprises:

counting-code for counting the received octets, wherein the counting-code is stored and run on the DSP; and branching-code for branching from the comparing-code to the counting-code, wherein the branching-code is stored and run on the DSP.

12. In a communications system implementing Signaling System No. 7, the system comprising a link, a transmitter for transmitting digital data on the link, and a receiver, a method comprising the steps of:

coupling to the link for receiving data;

receiving data from the link;

detecting an error condition of SS7 requiring the receiver to operate in an octet counting mode; and initiating the counting of received octets, the counting beginning after detecting the error condition.

13. The method of claim 12, wherein the step of detecting an error condition comprises the step of detecting the reception of a disconnect sequence on the link.

14. The method of claim 12, wherein the step of detecting an error condition comprises the step of detecting the reception of overflow data on the link.

15. In a communications system implementing Signaling System No. 7, the system comprising a link, a transmitter for transmitting digital data on the link, and a receiver, a computer readable medium containing program instructions comprising instructions for:

coupling to the link for receiving data;

receiving data from the link;

detecting an error condition of SS7 requiring the receiver to operate in an octet counting mode; and initiating the counting of received octets, the counting beginning after detecting the error condition.

16. The method of claim 15, wherein the step of detecting an error condition comprises the step of detecting the reception of a disconnect sequence on the link.

17. The method of claim 15, wherein the step of detecting an error condition comprises the step of detecting the reception of overflow data on the link.

* * * * *